No. 692,466. Patented Feb. 4, 1902.
C. W. MORRIS.
SALT CELLAR.
(Application filed Nov. 2, 1901.)
(No Model.)
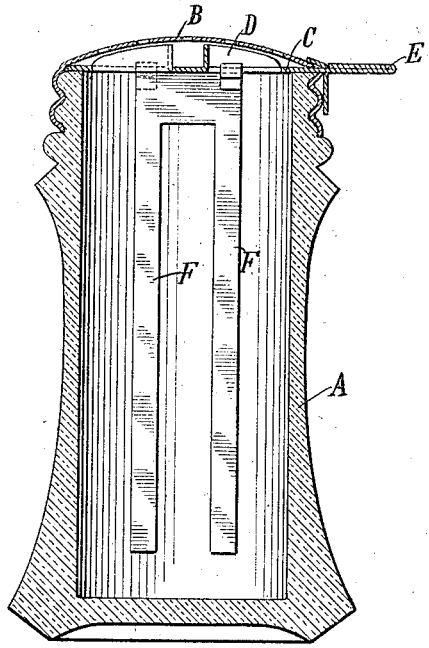
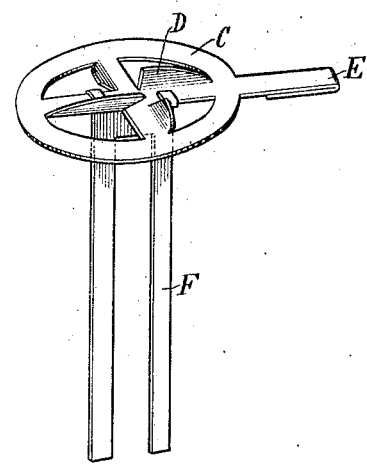
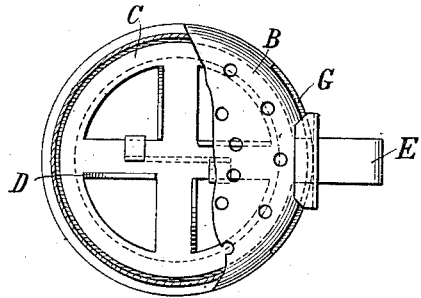
Witnesses:
Charles Wells Morris, Inventor
by Kerr, Page & Cooper, Att'ys

UNITED STATES PATENT OFFICE.

CHARLES WELLS MORRIS, OF PHILADELPHIA, PENNSYLVANIA.

SALT-CELLAR.

SPECIFICATION forming part of Letters Patent No. 692,466, dated February 4, 1902.

Application filed November 2, 1901. Serial No. 80,909. (No model.)

*To all whom it may concern:*

Be it known that I, CHARLES WELLS MORRIS, a citizen of the United States, residing in Philadelphia, in the county of Philadelphia and State of Pennsylvania, have invented certain new and useful Improvements in Salt-Cellars and the Like, of which the following is a full, true, and accurate description, reference being had to the drawings which accompany and form a part hereof.

My invention relates to vessels for holding salt, pepper, spices, &c., of the kind which are provided with perforated covers through which the contents may be emitted; and it consists in providing means for agitating the contents and preventing caking or lumping within the vessel or upon the inner surface of the perforated cover and means for forcing the contents through the perforations in the cover.

In the drawings, Figure 1 represents a view in vertical section of the invention applied to an ordinary glass or china salt-cellar. Fig. 2 is a plan view of the scraper-disk with the perforated cover partly cut away. Fig. 3 is a perspective view of the scraper-disk with the agitating-arms attached.

In carrying out my invention I employ an ordinary perforated cover B, of metal or other suitable material, which I attach to the vessel A in any ordinary way, as by screwing it down. The upper or perforated surface of the cover is slightly arched or crowned. Through one side of the cover, near the edge of the top thereof, I provide a narrow slot G, which extends around one-quarter of the circumference of the cover or thereabout. Within the cover I place a disk C, preferably of metal, upon one side of which and formed integrally with it there is a handle E, which extends through the slot G in the side of the cover. The interior portions of the disk C are cut and struck up in such a manner as to give to the disk the form of a flat ring with cross-bars at right angles to each other, thus providing large apertures in the disk for the passage of the contents from the vessel A into the space between the disk C and the perforated cover B.

The upper edges of the struck-up portions D of the disk are cut in a shape to conform to the curve of the inner surface of the arched cover B, against which they form an even contact, so that when operated they will act as scrapers to keep the perforations clear and to force the contents of the vessel through the perforations. The scraper-disk C fits loosely within the cover and is held in place when the vessel is in its normal position by the handle E, which fits tightly in the slot G, and when the vessel is turned upside down for the purpose of emitting the contents the scrapers D fit against the perforated top and are held in close contact therewith by the weight of the salt pressing upon the disk.

In order to prevent the contents from caking or lumping within the vessel, and so not falling upon the disk when the vessel is overturned, I attach rigidly to the under side of the disk C or its cross-bars two or more parallel arms or agitators F of sufficient length to reach almost to the bottom of the vessel A.

The operation of the device is as follows: The vessel A is held upside down and the handle E moved back and forth as far as the slot G will allow. Each movement revolves the scraper-disk C through about one-quarter of its circumference and causes each of the scrapers to pass over about one-quarter of the inner surface of the perforated cover, the whole of the said surface being thus scraped by each quarter-revolution of the disk C. The movement of the handle E also causes the parallel arms F to agitate the contents of the vessel and break up any lumps or cakes which may have formed therein.

The struck-up portion D of the disk C may be formed at right angles thereto, as in Fig. 2, or at an angle of about forty-five degrees, as in Fig. 3. The latter form is preferable, because when revolved in one direction the struck-up portions D act as scrapers to keep the perforations in the cover clear and when moved in the other direction they tend to press the contents through the perforations.

It will be understood that I do not limit my invention to the exact design of scraper-disk and parallel arms which I have described, as the construction may be varied by having more than two parallel arms or by having the disk made with more or less openings than those which I have mentioned in my description so long as the disk and scrapers are formed of one piece properly cut and struck up.

What I claim as my invention is—

1. In a vessel for condiments, the combination with a perforated cover, the upper surface of which is arched or crowned, of a disk within the cover having its interior portions cut and struck up so as to form a plurality of apertures therein and a plurality of scrapers on the upper side thereof and formed integrally therewith, the edges of which are shaped to conform to the curve of the cover, parallel agitating-arms rigidly attached to the under side of the disk, and a handle to actuate the disk extending through a horizontal slot in the side of the cover, substantially as described.

2. In a receptacle for condiments, the combination with a perforated cover having its upper surface arched, of a disk within the cover, a plurality of apertures therein and scrapers upon its upper side formed integrally therewith, parallel agitating-arms on its under side and a handle attached to the disk and extending through a horizontal slot in the side of the cover, substantially as described.

3. In a vessel for condiments, the combination, with a perforated cover, of a disk provided on its upper side with scrapers struck up at right angles to the disk and adapted to contact evenly with the inner surface of the perforated cover, apertures in the disk between the scrapers, a plurality of parallel arms rigidly attached to the under side of the disk, and a handle to revolve the disk, substantially as described.

4. In a vessel for condiments the combination with a perforated cover of a disk provided on its upper side with scrapers struck up diagonally to the plane of the disk and adapted to contact evenly with the inner surface of the perforated cover, apertures in the disk between the scrapers, a plurality of arms rigidly attached to the under side of the disk, and a handle to revolve the disk, substantially as described.

5. In a salt-cellar, the combination of the vessel A provided with the perforated cover B, the disk C loosely fitted within the said cover, the scrapers D on the upper side of said disk and formed integrally therewith, the agitating-arms F on the under side of the disk, and the handle E attached to the disk and extending through a slot in the side of the cover, as set forth.

CHARLES WELLS MORRIS.

Witnesses:
ROLAND S. MORRIS,
SYDNEY YOUNG.